(12) United States Patent
Madduri et al.

(10) Patent No.: US 12,234,301 B2
(45) Date of Patent: Feb. 25, 2025

(54) AMMONIUM-FUNCTIONALIZED SACCHARIDE POLYMERS AND METHODS FOR PRODUCTION AND USE THEREOF

(71) Applicant: Integrity Bio-Chemicals, LLC, Cresson, TX (US)

(72) Inventors: Ashoka V. R. Madduri, Belmont, MA (US); Laura Benavides, Humble, TX (US); Sameer Vhora, Fort Worth, TX (US); William Gibbs, Calgary (CA); Matthew B. Blackmon, Granbury, TX (US)

(73) Assignee: Integrity Bio-Chemicals, LLC, Cresson, TX (US)

( * ) Notice: Subject to any disclaimer, the term of this patent is extended or adjusted under 35 U.S.C. 154(b) by 660 days.

(21) Appl. No.: 17/423,145

(22) PCT Filed: Feb. 10, 2020

(86) PCT No.: PCT/US2020/017437
§ 371 (c)(1),
(2) Date: Jul. 15, 2021

(87) PCT Pub. No.: WO2021/006933
PCT Pub. Date: Jan. 14, 2021

(65) Prior Publication Data
US 2022/0127384 A1 Apr. 28, 2022

Related U.S. Application Data

(60) Provisional application No. 62/871,967, filed on Jul. 9, 2019.

(51) Int. Cl.
| | | |
|---|---|---|
| C08B 31/00 | (2006.01) | |
| B03D 1/008 | (2006.01) | |
| B03D 1/016 | (2006.01) | |
| C09D 103/04 | (2006.01) | |
| C09K 3/22 | (2006.01) | |
| B03D 1/02 | (2006.01) | |

(52) U.S. Cl.
CPC .............. C08B 31/00 (2013.01); B03D 1/008 (2013.01); B03D 1/016 (2013.01); C09D 103/04 (2013.01); C09K 3/22 (2013.01); *B03D 1/02* (2013.01); *B03D 2201/04* (2013.01)

(58) Field of Classification Search
None
See application file for complete search history.

(56) References Cited

U.S. PATENT DOCUMENTS

| | | | |
|---|---|---|---|
| 4,502,961 A | 3/1985 | Yong et al. | |
| 8,349,188 B2 | 1/2013 | Soane et al. | |
| 2009/0272693 A1* | 11/2009 | Mabille | C08L 1/02 |
| | | | 210/683 |
| 2017/0158522 A1 | 6/2017 | Wang et al. | |

FOREIGN PATENT DOCUMENTS

CN   108137357 A   6/2018

OTHER PUBLICATIONS

ISRWO for related PCT/US2020/017437 dated Jun. 12, 2020.

* cited by examiner

*Primary Examiner* — Yun Qian (57) ABSTRACT

Metal contaminants may be problematic in a number of industries, particularly in the mining industry. Fines production and dust control may be similarly problematic in many industries, including the mining industry. Reaction products formed from a saccharide polymer and diallyldimethylammonium chloride (DADMAC) under room temperature to heating conditions in the presence of a hydroxide base or a radical initiator may be effective for promoting removal of metal contaminants from clay-containing substances, such as through froth flotation. The reaction products may also be effective for mitigating fines production and providing dust control by forming a coating upon a plurality of particulates.

8 Claims, 2 Drawing Sheets

AMMONIUM-FUNCTIONALIZED SACCHARIDE POLYMERS AND METHODS FOR PRODUCTION AND USE THEREOF

BACKGROUND

Froth treatments may be used in the petroleum and mining industries, among others, in order to increase the value of a resource obtained therefrom. In addition to the petroleum and mining industries, froth treatments may also find significant use in drinking and wastewater treatment operations, and in fermentation processes.

In a particular example, froth treatments may be used to sequester minerals and water from bitumens mined from oil sands to leave the bitumen in a condition ready for processing into a more valuable hydrocarbon resource. Froth treatments may also be used in conjunction with traditional mining activities as well. Heavy metals, such as lead, mercury and arsenic, may commonly be present in the runoff from traditional mining activities, including those conducted for obtaining precious metals, such as gold, silver or platinum, or non-precious metals, such as copper. Indeed, in the case of a low productivity mine, the quantity of heavy metals liberated as waste may exceed the amount of desired metals obtained. The heavy metals liberated from mining activities can have significant environmental and health consequences for the surrounding environment and the people and animals living there.

Froth treatments utilize a flocculant, also known as a flocculating agent or frothing agent, to promote formation of a froth for sequestering a contaminant from a product stream in need of contaminant removal, thereby affording up-conversion of a substance in the product stream. The substance is obtained as a more-dense phase, also referred to as a gangue, that is separable from the less-dense froth, thereby allowing removal of the contaminants to take place. Conventional flocculants may include, for example, organic flocculants, such as polyacrylamide derivatives; inorganic flocculants, such as aluminum salts and ferric salts; and biopolymers, such as chitosan and alginates. A given flocculant may be selected based upon the type of substance in need of up-conversion and the particular contaminant being removed. For flocculants of all types, the flocculants may agglomerate into larger particle sizes and colloids (collectively referred to as "flocs") once exposed to a contaminant, thereby allowing separation of a desired material from flocculated contaminants to be realized, either by frothing or by sedimentation, depending on the densities of the agglomerated flocs and the product stream. Alternately, a desired material may be frothed or sedimented and separated from a non-flocculated contaminant, again depending on the particular flocculant used and the substance being separated. Organic and inorganic flocculants may exhibit a less desirable environmental profile than do biopolymer-derived flocculants. Low yields, poor flocculating efficiencies and high production costs compared to organic and inorganic flocculants may be problematic for some biopolymer flocculants.

An additional engineering issue commonly occurring in the mining industry is that of dust control, wherein the dust results from fines generated during the mining process. Fines may be present in combination with a plurality of particulates having a larger average size on the whole. Fines can result in numerous issues ranging from being a mere nuisance to those of extreme safety. For example, aerosolized dust particles in mining operations can represent extreme inhalation and fire hazards.

A number of engineering approaches may be used to limit dust production in mining operations and other industrial processes. Among the approaches that may be used include, for example, ventilation, water sprays, water curtain barriers, physical barriers, and the like. Unfortunately, these engineering approaches may provide limited success for controlling dust, and they may not be universally applicable for all situations. Moreover, some of the foregoing approaches may be rather expensive to implement relative to the benefits gained therefrom.

Another approach for mitigating the presence of fines involves applying a coating to a particulate material, thereby tempering the ability of the fines to aerosolize into dust particles. Coatings can represent one of the more effective approaches available for limiting aerosol formation from fines. Certain coating materials are not especially environmentally benign, however, and the coating material itself may represent a considerable added operational expense. For example, most conventional dust control products contain inorganic chloride salts, which are not particularly environmentally friendly and may lead to corrosion over time.

BRIEF DESCRIPTION OF THE DRAWINGS

The following figures are included to illustrate certain aspects of the present disclosure and should not be viewed as exclusive embodiments. The subject matter disclosed is capable of considerable modifications, alterations, combinations, and equivalents in form and function, as will occur to one of ordinary skill in the art and having the benefit of this disclosure.

DETAILED DESCRIPTION

The present disclosure generally relates to mining operations and other operations in which fines mitigation and/or contaminant sequestration may be performed and, more specifically, compositions effective for promoting fines mitigation and/or promoting sequestration of metal contaminants during various industrial processes.

As discussed above, contaminant removal and fines mitigation may be important in a variety of industrial processes, but particularly in mining operations. Current approaches for contaminant removal and fines mitigation may be less effective and more costly than desired. Some approaches using chemical agents may have an undesirable environmental profile and be overly expensive.

The present disclosure describes functionalized saccharide polymers that may be effective in various aspects for controlling fines and for promoting sequestration of metal contaminants in a froth. As such, the functionalized saccharide polymers disclosed herein may be particularly advantageous for use in conjunction with mining operations, since a common material may be applicable for addressing both problematic aspects of a mining process. Although a common material may be used for addressing fines production and promoting sequestration of metal contaminants, as discussed further herein, the manners in which the functionalized saccharide polymers of the present disclosure are used for these purposes are considerably different from one another. In particular, the functionalized saccharide polymers may be used in froth flotation processes to promote separation of metal contaminants from clay-containing substances and other materials, followed by subsequent metal contaminant separation using conventional frothing agents, thereby increasing the purity and value of a resource subjected to the froth flotation process. Alternately, the functionalized saccharide polymers may be used in conjunction with a sedimentation process to accomplish similar benefits. When used for fines mitigation, an aqueous solution or dispersion of the functionalized saccharide polymers may be applied to a particulate material, thereby forming a coating and limiting the ability of the fines to become aerosolized. In another approach, an aqueous solution or dispersion of the functionalized saccharide polymers may be sprayed as a water curtain to cause settling of fines that have already become aerosolized. In addition to mining operations, the functionalized saccharide polymers of the present disclosure may be used in other applications where separating metals and/or providing dust control is desired.

The functionalized saccharide polymers of the present disclosure comprise a reaction product of a saccharide polymer and diallyldimethylammonium chloride (DADMAC), which may be obtained under room temperature to heating conditions in the presence of a hydroxide base, optionally in the presence of an oxidant. As used herein, the term "room temperature" refers to a temperature of about 22° C. to about 25° C. "Heating conditions" may include temperatures up to about 150° C. Alternately, such reaction products may be obtained under room temperature to heating conditions in the presence of diallyldimethylammonium chloride and an oxygen-based radical initiator, such as potassium persulfate. DADMAC is a monomer that is usually polymerized under radical-mediated conditions to produce a polymer (poly-DADMAC) having a structure represented by Formula 1, wherein n is a positive integer.

Formula 1

The reaction products of the present disclosure are believed to have a completely different structure than does poly-DADMAC. In particular, the reaction products of the present disclosure produced in the presence of a hydroxide base are believed to form one or more of intermolecular crosslinks between adjacent saccharide polymer chains (Scheme 1), intramolecular crosslinks within a saccharide polymer chain (Scheme 2), or side chain functionalization of a saccharide polymer chain without becoming crosslinked (Scheme 3). The reaction conditions and presumed structures of potential reaction products formed under various conditions are shown below in Schemes 1-6 for the case wherein the saccharide polymer is maltodextrin. Other saccharide polymers may undergo similar reactions with DADMAC, and the structures shown in Schemes 1-6 should not be considered limiting of the scope of the present disclosure. Without being bound by any theory or mechanism, the hydroxide base employed in Schemes 1-3 is believed to promote formation of an alkoxide group upon the saccharide polymer, which may then react with a carbon-carbon double bond of DADMAC in a nucleophilic addition-type fashion.

Scheme 1

Scheme 2

Alternately, the side-chain functionalized saccharide polymer shown in Scheme 3 may be formed under radical-mediated conditions using an oxygen-based radical initiator, as shown in Scheme 4.

Without being bound by theory or mechanism, the potassium persulfate is believed to provide an oxygen-based radical (specifically a sulfate radical anion), leading to radical formation upon a hydroxyl group of the maltodextrin, which may then undergo coupling with a radical generated from one of the DADMAC allyl groups. In addition to the side-chain functionalized saccharide polymer shown in Scheme 4, intermolecular and intramolecular crosslinked saccharide polymers corresponding to those shown in Schemes 1 and 2, respectively, may be formed under the radical-mediated reaction conditions if another radical forms on the dangling allyl group. In the interest of brevity, separate schemes for producing the intermolecular and intramolecular crosslinked saccharide polymers under radical conditions are not shown here. Additional growth of a DADMAC polymer from the dangling allyl group may also occur in some instances.

In still another example, DADMAC may be converted to a bis-epoxide in the presence of an oxidant and a hydroxide base, which may then crosslink two saccharide polymers via opening of the epoxides, as shown in Scheme 5, or form intramolecular crosslinks as shown in Scheme 6. The resulting functionalized saccharide polymers are similar to those produced in Schemes 1 and 2, except for the addition of two secondary alcohols arising from the epoxide opening. Side-chain functionalization of the saccharide polymer with the bis-epoxide may also occur, wherein a dangling epoxide remains present upon the functionalized saccharide polymer (corresponding to the functionalized saccharide polymer of Scheme 3 with the addition of two secondary alcohols and a dangling epoxide), which may undergo a subsequent reaction with a nucleophile to open the dangling epoxide (e.g., to form a diol). In the interest of brevity, separate schemes showing functionalization of a dangling epoxide are not shown here.

Scheme 6

Poly-DADMAC has been used extensively in the water purification industry as a flocculant. Surprisingly, at least some of the reaction products described herein may outperform both poly-DADMAC and standard flocculants when used in conjunction with promoting froth flotation purification of clay-containing substances. Without being bound by theory or mechanism, the reaction products described herein are believed to limit swelling of clay minerals, thereby allowing more effective metals removal to be realized when forming a froth using conventional frothing agents, numerous examples of which will be familiar to one having ordinary skill in the art. Thus, the reaction products disclosed herein, when used in combination with conventional frothing agents, surprisingly allow enhanced performance of the conventional frothing agents to be realized when forming a froth in the presence of a clay-containing substance. Because of the significant saccharide polymer content of the reaction products disclosed herein, the reaction products are believed to provide a lower environmental burden than do DADMAC or poly-DADMAC themselves. In addition, the reaction products of the present disclosure may be obtained relatively inexpensively from readily available starting materials. As a result, the reaction products of the present disclosure may allow more expensive conventional frothing agents to be used more effectively, thereby lowering material costs. The reaction products of the present disclosure are similarly advantageous in comparison to other types of coating compositions typically used for controlling dust in various processes.

Advantageously, once metal contaminant separation has been performed with the aid of any of the reaction products of the present disclosure, the metal contaminant may be released from the separated froth or sediment, if desired, thereby allowing the contaminant to be recovered as an additional product stream, which may be valuable in its own right. For example, residual transition metals or rare earth metals separated from a mining product may be subsequently processed into a valuable resource, instead of being simply discarded. In the case of metal isolation from a separated froth or sediment, the froth or sediment may simply be pyrolyzed to afford the corresponding metal oxides, which may then be further processed as needed. Acids may also be used to promote release of the sequestered metals.

With respect to dust control, the reaction products of the present disclosure do not contain significant quantities of inorganic chloride salts, thereby improving their environmental profile compared to conventional dust control agents. Moreover, the reaction products of the present disclosure may represent a more cost-effective solution for promoting dust control compared to more aggressive engineering controls for addressing dust.

Accordingly, the present disclosure provides compositions comprising a reaction product of a saccharide polymer and DADMAC obtained under room temperature to heating conditions in the presence of base, particularly a hydroxide base, or in the presence of a radical initiator, particularly an oxygen-based radical initiator such as potassium persulfate. The reaction product is believed to be structurally distinct from poly-DADMAC and may display performance distinction when used for promoting froth floatation and/or dust control, as shown further below.

In non-limiting embodiments, the reaction product may comprise one or more of Structures 2-4 or similar functionalized saccharide polymers prepared from alternative polysaccharides or oligosaccharides, or a further reaction product thereof, the preparations of which are shown in Schemes 1-4 and described in further detail above.

Structure 2

Structure 3

Structure 4

Any of Structures 2-4 may be prepared by reacting diallyldimethylammonium chloride with a saccharide polymer in the presence of a hydroxide base, or by reacting diallyldimethylammonium chloride with a saccharide polymer in the presence of a radical generator, particularly an oxygen-based radical generator such as potassium persulfate, and a radical stabilizer to promote radical formation, such as tetramethylethylenediamine. Other suitable radical generators and radical stabilizers suitable for use in forming the reaction products will be familiar to one having ordinary skill in the art.

Functionalized saccharide polymers of the present disclosure may be alternately produced in the presence of a hydroxide base and an oxidant, wherein two hydroxyl groups may be formed upon an intermolecular or intramolecular crosslink derived from DADMAC, or one hydroxyl group and a dangling epoxide may be present in a functionalized saccharide polymer bearing side chain functionalization derived from DADMAC. The hydroxide base and oxidant may initially convert diallyldimethylammonium chloride into its corresponding bis-epoxide, which may subsequently undergo a reaction with the saccharide polymer to form one or more of the foregoing functionalized polysaccharides. Suitable oxidants for forming the bis-epoxide include, but are not limited to, hydrogen peroxide and sodium hypochlorite. Reaction products formed through contacting a saccharide polymer with the bis-epoxide of diallyldimethylammonium chloride may comprise one or more of Structures 5-7 or similar functionalized saccharide polymers prepared from alternative polysaccharides or oligosaccharides, or a further reaction product thereof.

Structure 5

Structure 6

-continued

Structure 7

The dangling epoxide in Structure 7, if present, may undergo further reaction with a nucleophile, such as to form a diol in some instances.

Suitable saccharide polymers may comprise a polysaccharide in some embodiments of the present disclosure. Polysaccharides suitable for use in the present disclosure are environmentally safe, substantially nonhazardous to work with, and generally biocompatible. Polysaccharides such as dextran, levan, pectin, guar, and starch, for example, as well as their functionalized forms, may also be biodegradable and pose little to no threat to the environment, even when used in high concentrations. In addition, these materials may be sourced or produced at relatively low cost.

Suitable polysaccharides that may undergo functionalization according to the disclosure herein include, for example, levan, dextran, guar (guar gum), scleroglucan, welan, pullulan, xanthan (xanthan gum), schizophyllan, cellulose, pectin and any combination thereof. Dextran, levan, pectin and guar may be particularly desirable polysaccharides for use in forming the reaction product disclosed herein. Derivative forms of the foregoing polysaccharides may be used as well. Pectin, for instance, is already used in froth flotation processes, and performance thereof may be further enhanced through use of the disclosure herein. Guar derivatives suitable for use in the various embodiments of the present disclosure may include, for example, carboxyalkyl or hydroxyalkyl derivatives of guar, such as, for example, carboxymethyl guar, carboxymethylhydroxyethyl guar, hydroxyethyl guar, carboxymethylhydroxypropyl guar, ethyl carboxymethyl guar, and hydroxypropylmethyl guar. Suitable dextran and levan derivatives may similarly include, for example, carboxyalkyl or hydroxyalkyl derivatives of dextran or levan, such as, for example, carboxymethyl dextran (levan), carboxymethylhydroxyethyl dextran (levan), hydroxyethyl dextran (levan), carboxymethylhydroxypropyl dextran (levan), ethyl carboxymethyl dextran (levan), and hydroxypropylmethyl dextran (levan).

Starch is another suitable polysaccharide that may undergo functionalization according to the disclosure herein. Suitable starches may include, for example, an unmodified starch or a modified starch, such as an ionic starch, an oxidized starch, an ethoxylated starch, a hydroxyalkylated starch, a carboxylated starch, an aminated starch, the like or any combination thereof. Modified starches may be produced chemically through oxidation, acid thinning, chemical functionalization, enzymatic functionalization, or any combination thereof. Starches suitable for use in the disclosure herein may come from any plant source including, but not limited to, corn, potato, sweet potato, wheat, rice, sago, tapioca, waxy maize, sorghum, high amylose corn, or the like. Starches may be cooked (pre-gelatinized) or uncooked when functionalized according to the disclosure herein.

Polysaccharides suitable for use in the embodiments of the present disclosure may encompass a wide range of molecular weights. In illustrative embodiments, the molecular weight of suitable polysaccharides may range between about 1 million and about 50 million Daltons. In more specific embodiments, the polysaccharide molecular weight, particularly for dextrans and levans, may range between about 1 million and about 5 million Daltons, or between about 3 million and about 10 million Daltons, or between 5 million and about 10 million Daltons, or between 10 million and about 20 million Daltons, or between 20 million and about 30 million Daltons, or between 30 million and about 40 million Daltons, or between 40 million and about 50 million Daltons. Smaller polysaccharides may also be used as well.

In addition to polysaccharides, saccharide polymers suitable for use in the disclosure herein may comprise an oligosaccharide having 3 to about 20 monosaccharide units, or 3 to about 10 monosaccharide units. Accordingly, their molecular weight is much smaller than that of polysaccharides, typically in the range of about 3200 or lower, or about 1800 or lower. Oligosaccharides functionalized according to the present disclosure may afford similar advantages to those realizable with larger saccharide polymers (polysaccharides). Maltodextrin may be a particularly advantageous oligosaccharide for use in forming functionalized saccharide polymers of the present disclosure, particularly those suitable for performing froth flotation or a similar technique and/or for mitigating fines.

Maltodextrins suitable for forming a functionalized saccharide polymer of the present disclosure may be obtained from hydrolysis or pyrolysis of starch, specifically the amylose component of starch, according to non-limiting embodiments. In addition, suitable maltodextrins may exhibit dextrose equivalent values ranging from 3 to about 20. In more specific embodiments, dextrose equivalent values of the maltodextrins may range from about 4.5 to about 7.0, or from about 7.0 to about 10.0, or from about 9.0 to about 12.0.

Functionalization of saccharide polymers according to the disclosure herein may result an amount of DADMAC in the reaction product ranging from about 1 mole percent to about 75 mole percent per total moles of saccharide monomers, or about 1 mole percent to about 60 mole percent per total moles of saccharide monomers, or about 1 mole percent to about 50 mole percent per total moles of saccharide monomers. That is, about 1 to about 50, 60 or 75 saccharide monomers may be functionalized with DADMAC per 100 total saccharide monomers. An effective range for metal contaminant removal may include about 25 mole percent to about 75 mole percent per total moles of saccharide monomers. An effective range for dust control may range from about 1 mole percent to about 50 mole percent per total moles of saccharide monomers. Functionalized saccharide polymers produced in the presence of a hydroxide base may be particularly effective for these purposes.

In addition to DADMAC, it is to be appreciated that other allylammonium salts bearing a single allyl group may be reacted with a saccharide polymer in a similar manner to that disclosed above for maltodextrin and other saccharide polymers. Formula 8 below shows the structure of an alternative reaction product that may be obtained through application of the principles of the present disclosure, wherein R is a $C_1$-$C_{100}$ hydrocarbyl group, such as a $C_1$-$C_{30}$ alkyl group or an aryl group, and R' is H or OH. In more particular embodiments, such alternative reaction products may have Structure 8A below, in which two of the R groups are methyl.

Structure 8

Structure 8A

Since Structures 8 and 8A bear a quaternary ammonium group, it is to be appreciated that their functionality may be similar to that described herein for DADMAC-functionalized saccharide polymers. Again, it is to be emphasized that the particular saccharide polymer shown in Structures 8 and 8A are illustrative and non-limiting of the scope of the present disclosure.

In another non-limiting embodiment, functionalized saccharide polymers having Structure 4 or a similar functionalized saccharide polymer structure may be further functionalized through reaction of the dangling double bond derived from DADMAC. In illustrative examples, the dangling double bond may undergo epoxidation followed by optional nucleophilic opening, hydroxylation, polymerization, or the like. The dangling epoxide of Structure 7 or a similar functionalized saccharide polymer structure may similarly undergo nucleophilic opening to afford additional functionalized saccharide polymers of the present disclosure. Other types of functionalization of the dangling double bond and/or dangling epoxide may be envisioned by one having ordinary skill in the art. In another particular example, a poly-DADMAC polymer chain may be grown (e.g., by radical polymerization) from the dangling double bond of Structure 4 or a similar functionalized saccharide polymer structure.

The functionalized saccharide polymers disclosed herein may be further formulated with a suitable liquid carrier, such as water or a similar aqueous carrier fluid. The functionalized saccharide polymers may have a concentration in the aqueous carrier fluid ranging from about 1 wt. % to about 25 wt. %, or from about 5 wt. % to about 20 wt. %, or from about 5 wt. % to about 15 wt. %, or from about 5 wt. % to about 10 wt. %. The aqueous carrier fluid may be derived from any source including, for example, fresh water, salt water, sea water, ground water, flowback water, acidified water, aqueous salt solutions, or the like. A water-miscible co-solvent may be present in the aqueous carrier fluid in some cases.

In some embodiments, the functionalized saccharide polymers of the present disclosure may be formulated as a subterranean treatment fluid. Treatment fluids may be used in a variety of subterranean treatment operations to facilitate or promote a particular action within the subterranean formation. As used herein, the terms "treat," "treatment," "treating," and grammatical equivalents thereof refer to any subterranean operation that uses a fluid in conjunction with achieving a desired function and/or for a desired purpose. Unless otherwise specified, use of these terms does not imply any particular action by the treatment fluid or a component thereof. Illustrative treatment operations that may be facilitated through use of the functionalized saccharide polymers of the present disclosure include, without limitation, drilling operations, stimulation operations, production operations, remediation operations, sand control operations, and the like, which may include, for example, fracturing operations, gravel packing operations, acidizing operations, descaling operations, consolidation operations, workover operations, cleanup operations, and the like. In addition to offering the potential for promoting frothing or affording dust control, the functionalized saccharide polymers may fulfill various functions in a treatment fluid, including providing functionality as a surfactant.

Alternately, the functionalized saccharide polymers of the present disclosure may be used in conjunction with subterranean operations such as, for example, excavation or mining. In particular, the functionalized saccharide polymers may be used in froth flotation processes conducted upon a mining product and/or provide dust control of fines generated during a mining process by spraying a coating comprising the functionalized saccharide polymers onto a mining product. Other dust control applications not associated with mining operations may also be applicable, as discussed further herein. In addition to promoting metal contaminant separation during froth flotation, the functionalized saccharide polymers disclosed herein may also be applicable to sedimentation-based separation processes in some instances.

As used herein, the term "drilling operation" refers to the process of forming a wellbore in a subterranean formation. As used herein, the term "drilling fluid" refers to a fluid used in drilling a wellbore.

As used herein, the term "stimulation operation" refers to an activity conducted within a wellbore to increase production therefrom. As used herein, the term "stimulation fluid" refers to a fluid used downhole during a stimulation activity to increase production of a resource from the subterranean formation. In particular instances, stimulation fluids may include a fracturing fluid or an acidizing fluid.

As used herein, the terms "clean-up operation" or "damage control operation" refer to any operation for removing extraneous material from a wellbore to increase production. As used herein, the terms "clean-up fluid" or "damage control fluid" refer to a fluid used for removing an unwanted material from a wellbore that otherwise blocks flow of a desired fluid therethrough. In one example, a clean-up fluid can be an acidified fluid for removing material formed by one or more perforation treatments. In another example, a clean-up fluid can be used to remove a filter cake upon the wellbore walls.

As used herein, the term "fracturing operation" refers to a high-pressure operation that creates or extends a plurality of flow channels within a subterranean formation. As used herein, the term "fracturing fluid" refers to a viscosified fluid used in conjunction with a fracturing operation.

As used herein, the term "remediation operation" refers to any operation designed to maintain, increase, or restore a specific rate of production from a wellbore, which may include stimulation operations or clean-up operations. As used herein, the term "remediation fluid" refers to any fluid used in conjunction with a remediation operation.

As used herein, the term "acidizing operation" refers to any operation designed to remove an acid-soluble material from a wellbore, particularly an acid-soluble material that comprises at least a portion of the subterranean formation. As used herein, the term "acidizing fluid" refers to a fluid used during an acidizing operation.

As used herein, the term "spotting fluid" refers to a fluid designed for localized treatment of a subterranean formation. In one example, a spotting fluid can include a lost circulation material for treatment of a specific section of the wellbore, such as to seal off fractures in the wellbore and prevent sag. In another example, a spotting fluid can include a water control material or material designed to free a stuck piece of drilling or extraction equipment.

As used herein, the term "completion fluid" refers to a fluid used during the completion phase of a wellbore, including cementing compositions and cementing fluids.

As used herein, the term "cementing fluid" refers to a fluid used during cementing operations within a wellbore penetrating a subterranean formation.

The functionalized saccharide polymers of the present disclosure may be present in any of the treatment fluids discussed above. Treatment fluids of the present disclosure may feature a concentration of the functionalized saccharide polymers ranging from about 0.1 gallons per thousand gallons (gpt) to about 10 gpt, or from about 0.5 gpt to about 5 gpt, or from about 1 gpt to about 3 gpt. These concentrations correspond to volume/volume percentages ranging from about 0.01% to about 1%, or from about 0.05% to about 0.5%, or from 0.1% to about 0.3%. The chosen concentration may vary depending upon the particular requirements for a given treatment operation and/or the specific subterranean conditions that are encountered downhole.

Treatment fluids containing the functionalized saccharide polymers may optionally further comprise any number of additives, particularly those that are commonly used in the oilfield services industry. Illustrative additives that may be present in combination with the functionalized saccharide polymers of the present disclosure include, for example, surfactants, viscosifiers, gelling agents, gel stabilizers, antioxidants, polymer degradation prevention additives, relative permeability modifiers, scale inhibitors, corrosion inhibitors, chelating agents, foaming agents, defoaming agents, antifoaming agents, emulsifying agents, de-emulsifying agents, iron control agents, proppants or other particulates, particulate diverters, salts, acids, fluid loss control additives, gas, catalysts, other clay control agents, dispersants, flocculants, scavengers (e.g., $H_2S$ scavengers, $CO_2$ scavengers or $O_2$ scavengers), lubricants, breakers, friction reducers, bridging agents, weighting agents, solubilizers, pH control agents (e.g., buffers), hydrate inhibitors, consolidating agents, bactericides, catalysts, the like, and any combination thereof. Suitable examples of these additives will be familiar to one having ordinary skill in the art.

In a particular example, the functionalized saccharide polymers may be disposed as a coating upon proppant particulates used in a fracturing operation. The coating may aid in limiting dust formed from proppant fines. In addition, the functionalized saccharide polymers may exert beneficial effects downhole, such as for promoting surfactant properties or clay stabilization due to their polycationic character. The functionalized saccharide polymers may exert similar surfactant properties or clay stabilization effects in a treatment fluid when not disposed upon a particulate material as well.

The functionalized saccharide polymers disclosed herein may be employed advantageously in a wide array of applications in which particulate materials are used, especially those in which dust control and mitigation of other issues associated with fines are desirable. In addition, the desirable properties afforded by the functionalized polysaccharides themselves can further enhance certain types of applications as well. Several illustrative applications are described in brief hereinafter that may be advantageously conducted using the functionalized saccharide polymers of the present disclosure as a coating for particulate materials.

The functionalized saccharide polymers of the present disclosure may be coated onto a base particulate material in some embodiments of the present disclosure. Suitable base particulate materials that may be coated with the functionalized saccharide polymers include, for example, a clay material, such as vermiculite, montmorillonite or bentonite. Other suitable base particulate materials may comprise wood products, including shavings, sawdust, bark, chips and the like, one or more of which may be compressed together in a pellet in some applications. Processed wood particulate materials such as charcoal particulates, for example, may also be suitably coated with the functionalized saccharide polymers disclosed herein. Coated animal litter products may also be formed according to the disclosure herein. Coating of any of the foregoing may be effective for decreasing the amount of dust formed from the particulate materials during their handling and use.

As referenced above, the functionalized saccharide polymers of the present disclosure may be used for promoting metal contaminant removal from a substance by froth flotation, particularly a clay-containing substance. In particular, methods for contaminant removal may comprise exposing a functionalized saccharide polymer reaction product of the present disclosure to a clay-containing substance in need of contaminant remediation, interacting the clay-containing substance with a frothing agent to form a froth bearing at least one metal contaminant separated from the clay-containing substance; and separating the froth from the clay-containing substance. The substance in need of contaminant remediation by froth floatation may comprise a clay mineral, such as illite, smectite, kaolinite, or chlorite. Suitable techniques and equipment for performing a froth flotation separation will be familiar to one having ordinary skill in the art. Likewise, frothing agents suitable for forming a froth will be familiar to one having ordinary skill in the art. The substance undergoing contaminant remediation may be bitumen or a mining product, such as a copper/gold mining product, in more specific examples of the present disclosure.

Froth flotation may be used to separate metal contaminants from mined ore, which may comprise one or more of soil, top soil, clay, rock or the like. Water and frothing agents are added to the mined ore in order to create a froth, and air bubbles are introduced. Collectors effective to promote metal sequestration may be introduced with the frothing agents. Hydrophobic particles comprising bound metal contaminants may become incorporated within the froth, which may then be skimmed off to form a concentrate laden in metals. The functionalized saccharide polymers described herein may aid this process by preventing the clays from swelling, thereby allowing the collectors to bond the metal (s) for separation within the froth.

After separating the froth from the substance in need of contaminant remediation, metal contaminants may be recovered from the froth, if desired. For example, the metal contaminants may be processed into a form more suitable for waste disposal. Alternately, recovered metal contaminants may be reprocessed and sold as a value component. For example, once separated from a substance in need of contaminant remediation, rare earth metals or other precious or semi-precious metals may be reprocessed and sold. In a non-limiting example, metal recovery from the froth may take place by a pyrolysis process, followed by recovery of one or more metal oxides from the resulting pyrolysis residue. Acid treatment may also be used to promote metal recovery.

When used for conducting contaminant removal, an amount of the functionalized saccharide polymer may be sufficient to produce an increase in metal uptake in the froth by about 3 wt. % to about 5 wt. % relative to froth floatation conducted without the functionalized saccharide polymer being present. Any conventional frothing agent, including organic flocculants, such as polyacrylamide derivatives, inorganic flocculants, such as aluminum salts and ferric salts, and biopolymers, such as chitosan and alginates, may be used in combination with the functionalized saccharide polymers disclosed herein.

When used for controlling dust and mitigating the presence of fines, the functionalized saccharide polymers of the present disclosure may be exposed to a plurality of particulates, and form a coating comprising the functionalized saccharide polymer upon at least a portion of the plurality of particulates. Exposing the plurality of particulates to the functionalized saccharide polymer may comprise spraying a composition comprising the functionalized saccharide polymer upon the plurality of particulates. The composition may be sprayed upon the plurality of particulates before fines have become aerosolized, or the composition may be sprayed onto aerosolized particulates to promote settling thereof. For example, the composition may be sprayed as a water curtain to limit the distance that aerosolized fines may travel.

EMBODIMENTS DISCLOSED HEREIN INCLUDE

A. Functionalized saccharide polymer compositions: The compositions comprise: a reaction product of a saccharide polymer and diallyldimethylammonium chloride (DADMAC) obtained under room temperature to heating conditions in the presence of a hydroxide base or in the presence of a radical initiator.

A1: Functionalized saccharide polymer compositions prepared by a process comprising forming a reaction mixture comprising a saccharide polymer, diallyldimethylammonium chloride and a hydroxide base or a radical initiator; and producing a reaction product from the reaction mixture under room temperature to heating conditions.

B. Contaminant removal methods. The methods comprise: exposing a composition comprising a reaction product of a saccharide polymer and diallyldimethylammonium chloride (DADMAC) obtained under room temperature to heating conditions in the presence of a hydroxide base or in the presence of a radical initiator to a clay-containing substance in need of contaminant remediation; interacting the clay-containing substance with a frothing agent to form a froth bearing at least one metal contaminant separated from the clay-containing substance; and separating the froth from the clay-containing substance.

C. Coating and dust control methods. The methods comprise: exposing a composition comprising a reaction product of a saccharide polymer and diallyldimethylammonium chloride (DADMAC) obtained under room temperature to heating conditions in the presence of a hydroxide base or in the presence of a radical initiator to a plurality of particulates; and forming a coating comprising the reaction product on at least a portion of the plurality of particulates.

D. Methods for forming a functionalized saccharide polymer composition. The methods comprise: forming a reaction mixture comprising a saccharide polymer, diallyldimethylammonium chloride and a hydroxide base or a radical initiator; and producing a reaction product from the reaction mixture under room temperature to heating conditions.

E. Coated particulates. The coated particulates comprise: a base particulate; and a coating comprising a composition comprising a reaction product of a saccharide polymer and diallyldimethylammonium chloride (DADMAC) obtained under room temperature to heating conditions in the presence of a hydroxide base or in the presence of a radical initiator disposed upon the base particulate.

Embodiments A, A1, and B-E may have one or more of the following additional elements in any combination.

Element 1: wherein the reaction product comprises one or more of Structures 2-4

Structure 2

Structure 3

Structure 4 or a further reaction product thereof.

Element 1A: wherein the diallyldimethylammonium chloride is pre-oxidized to a bis-epoxide prior to forming the reaction product with the saccharide polymer and the reaction product comprises one or more of Structures 5-7

Structure 5

Structure 6

Structure 7 or a further reaction product thereof.

Element 2: wherein the saccharide polymer comprises at least one polysaccharide selected from the group consisting of a dextran, a levan, a pectin, a guar, a starch, and any combination thereof.

Element 3: wherein the saccharide polymer comprises an oligosaccharide having 3 to about 20 monosaccharide units.

Element 4: wherein the oligosaccharide comprises maltodextrin.

Element 5: wherein the composition further comprises an aqueous carrier fluid.

Element 6: wherein an amount of DADMAC comprising the reaction product is about 1 mole percent to about 60 mole percent per total moles of saccharide monomers.

Element 7: wherein the clay-containing substance is obtained from a mining operation.

Element 8: wherein the clay-containing substance comprises bitumen or a copper/gold mining product.

Element 9: wherein the method further comprises recovering one or more metals from the froth.

Element 10: wherein the plurality of particulates is formed during a mining operation.

Element 11: wherein the coating decreases an amount of dust formed from the plurality of particulates.

Element 12: wherein the composition is sprayed onto a portion of the plurality of particulates that has been aerosolized.

Element 13: wherein the base particulates comprise an animal litter product, wood chips, a clay material, bitumen, proppant particulates, or any combination thereof.

Element 14: wherein the reaction mixture comprises the saccharide polymer, diallyldimethylammonium chloride, the hydroxide base, and an oxidant.

By way of non-limiting example, exemplary combinations applicable to A, A1 and B-E include: 1 or 1A and 3; 1 or 1A and 4; 1 or 1A, 3 and 4; 1 or 1A and 5; 1 or 1A and 6; 2 and 5; 2 and 6; 3 and 5; 3 and 6; 3-5; 3, 4 and 6; 3, 4 and 14; 1A, 3 and 14; 1A, 4 and 14; 1A, 5 and 14; 6 and 14; and 1A, 6 and 14. Exemplary combinations applicable to B include any of the combinations applicable to A, A1 and B-E in further combination with one or more of elements 7-9 and further include elements 7 and 8; 7 and 9; and 8 and 9. Exemplary combinations applicable to C include any of the combinations applicable to A, A1 and B-E in further combination with one or more of elements 10-13 and further include elements 10 and 11; 10 and 12; 10 and 13; 11 and 12; 11 and 13; and 12 and 13. Exemplary combinations applicable to E include any of the combinations applicable to A, A1 and B-E in further combination with element 13.

To facilitate a better understanding of the disclosure herein, the following examples of various representative embodiments are given. In no way should the following examples be read to limit, or to define, the scope of the invention.

EXAMPLES

Figure 1:
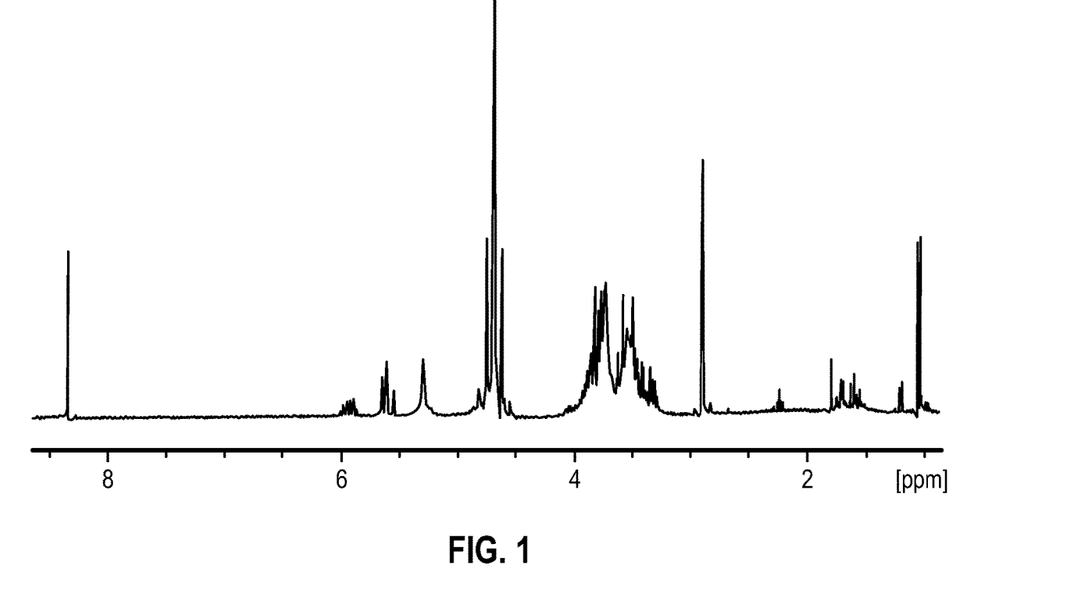
FIG. 1 shows an illustrative $^1$H NMR of a maltodextrin/DADMAC reaction product in $D_2O$.
Figure 2:
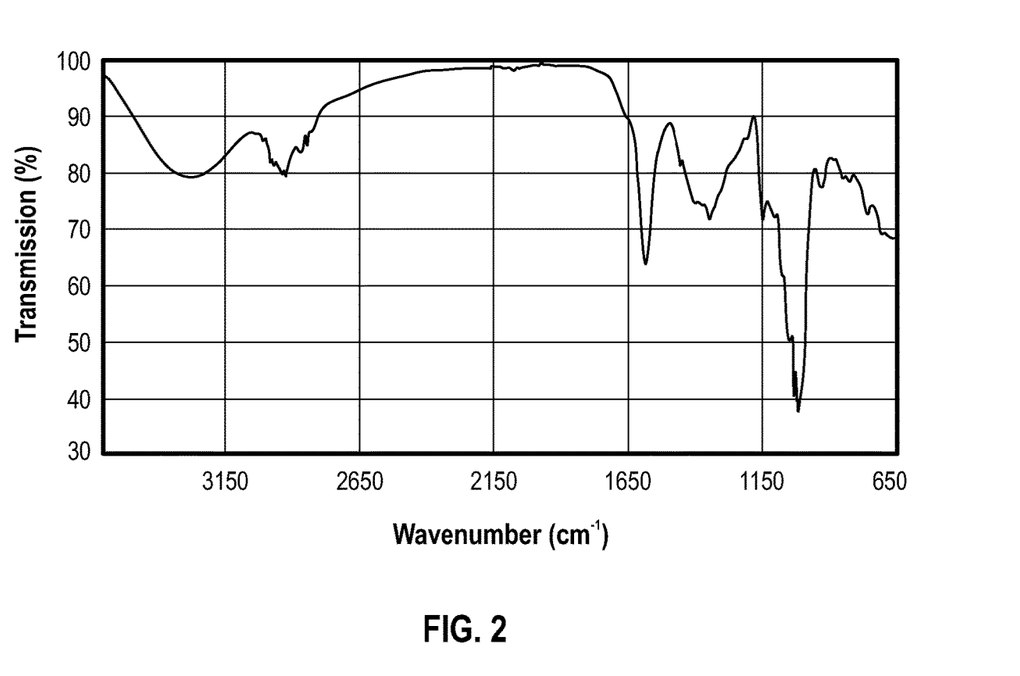
FIG. 2 shows an illustrative infrared spectrum of a maltodextrin/DADMAC reaction product.

Example 1: Synthesis. Maltodextrin and DADMAC were reacted in the presence of KOH for 2-3 hours at 60° C. FIG. 1 shows an illustrative $^1$H NMR of the maltodextrin/DADMAC reaction product in $D_2O$. FIG. 2 shows an illustrative infrared spectrum of the maltodextrin/DADMAC reaction product.

Example 2: Froth Flotation. A composition comprising a reaction product of the present disclosure (maltodextrin/DADMAC reaction product formed in the presence of potassium hydroxide—Example 1) was combined with a clay-containing mining ore (2 kg reaction product/ton ore) and subjected to froth floatation using a conventional frothing agent and frothing conditions. In particular, the ore and the reaction product were ground together with water, and the resulting pulp was discharged into a floatation cell, completely submerging the impeller into the pulp. Frothing agent was added, and the resulting froth was scraped from the liquid surface periodically. The froth, containing concentrated contaminants, was then filtered. Frothing and filtration were repeated several times.

Figure 3:
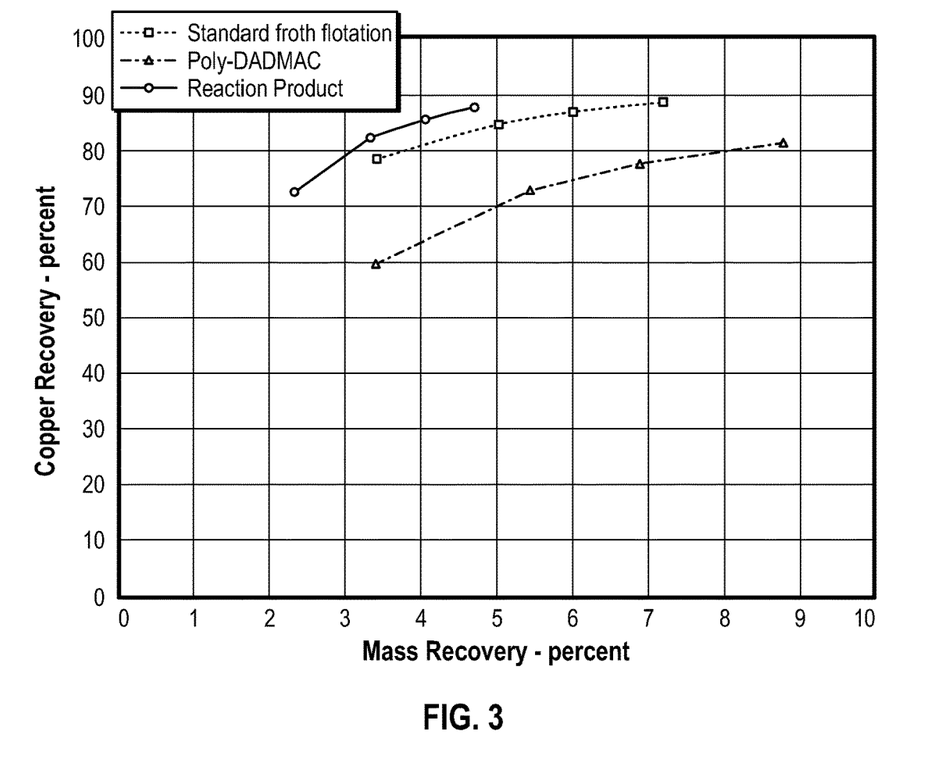
FIG. 3 shows a graph of percent metal removed during froth floatation using a reaction product of the present disclosure in comparison to other substances.

Metal recovery was compared against samples treated with a conventional frothing agent in the absence of a functionalized saccharide polymer and with poly-DADMAC in combination with a conventional frothing agent. As shown in FIG. 3, the functionalized saccharide polymer was considerably more effective for promoting metals separation than were either of the controls.

Figure 4:
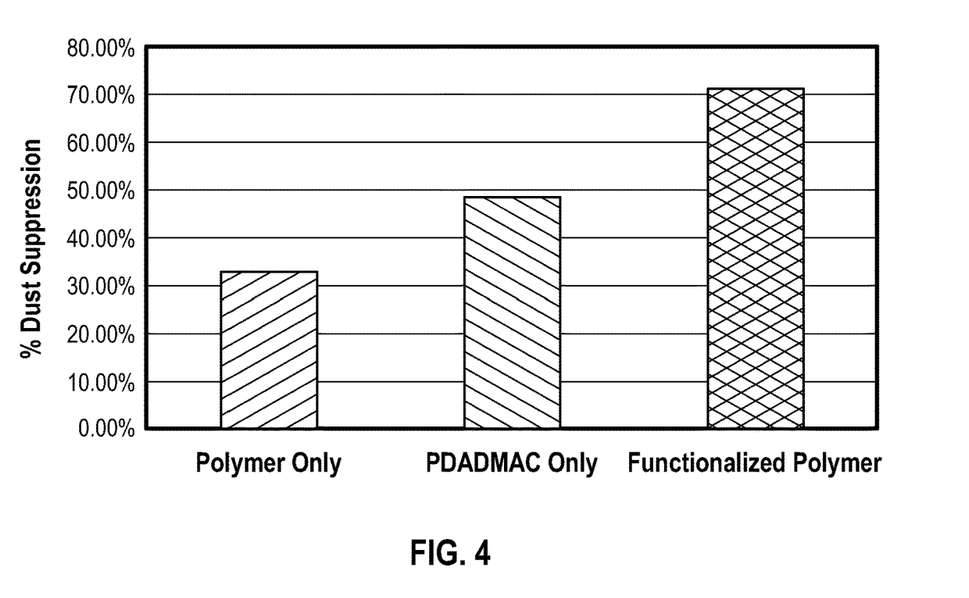
FIG. 4 shows a graph of the decrease in dust formation using a reaction product of the present disclosure in comparison to other substances.

Example 3: Dust Control. A composition comprising a reaction product of the present disclosure (maltodextrin/DADMAC reaction product formed in the presence of potassium hydroxide—Example 1) was sprayed onto a sample of bentonite clay. The loading of the reaction product upon the clay particulates was 0.5 wt. %. Dust formation of the coated clay was compared against clay samples sprayed with maltodextrin only and with poly-DADMAC. Testing was conducted using a TSI AM520 aerosol monitor by pouring 200 grams of the coated particulates through a funnel from a set height and counting dust particles produced above 2.5 microns in size. Each sample was measured 5 times to improve statistical accuracy. As shown in FIG. 4, the functionalized saccharide polymer was considerably more effective for promoting dust control.

Unless otherwise indicated, all numbers expressing quantities and the like in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

One or more illustrative embodiments incorporating various features are presented herein. Not all features of a physical implementation are described or shown in this application for the sake of clarity. It is understood that in the development of a physical embodiment incorporating the embodiments of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

While various systems, tools and methods are described herein in terms of "comprising" various components or steps, the systems, tools and methods can also "consist essentially of" or "consist of" the various components and steps.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Therefore, the disclosed systems, tools and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems, tools and methods illustratively disclosed herein may suitably be practiced in the absence of any element that is not specifically disclosed herein and/or any optional element disclosed herein. While systems, tools and methods are described in terms of "comprising," "containing," or "including" various components or steps, the systems, tools and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted.

What is claimed is the following:

1. A method comprising:
providing a composition comprising a reaction product of a saccharide polymer and diallyldimethylammonium chloride (DADMAC) obtained under room temperature to heating conditions in the presence of a hydroxide base or in the presence of a radical initiator;
wherein the DADMAC is not polymerized in the reaction product;
exposing the composition to a clay-containing substance in need of contaminant remediation;
interacting the clay-containing substance with a frothing agent to form a froth bearing at least one metal contaminant separated from the clay-containing substance; and
separating the froth from the clay-containing substance.

2. The method of claim 1, wherein the clay-containing substance is obtained from a mining operation.

3. The method of claim 1, wherein the clay-containing substance comprises bitumen or a copper/gold mining product.

4. The method of claim 1, further comprising:
recovering one or more metals from the froth.

5. The method of claim 1, wherein the saccharide polymer comprises at least one polysaccharide selected from the group consisting of a dextran, a levan, a levan, a guar, a starch and any combination thereof.

6. The method of claim 1, wherein the saccharide polymer comprises an oligosaccharide having 3 to about 20 monosaccharide units.

7. The method of claim 6, wherein the oligosaccharide comprises maltodextrin.

8. The method of claim 1, wherein an amount of DADMAC comprising the reaction product is about 1 mole percent to about 60 mole percent per total moles of saccharide monomers.

* * * * *